Dec. 18, 1962  W. G. WAITE ETAL  3,069,336
PROTECTION OF SHIPS' HULLS
Filed May 22, 1958  4 Sheets-Sheet 1

INVENTORS
WILLIAM GODFREY WAITE
MARK VARVILL
PETER VINCENT PALMER
JOHN HENRY KENNETH TAIT
BY
AGENT

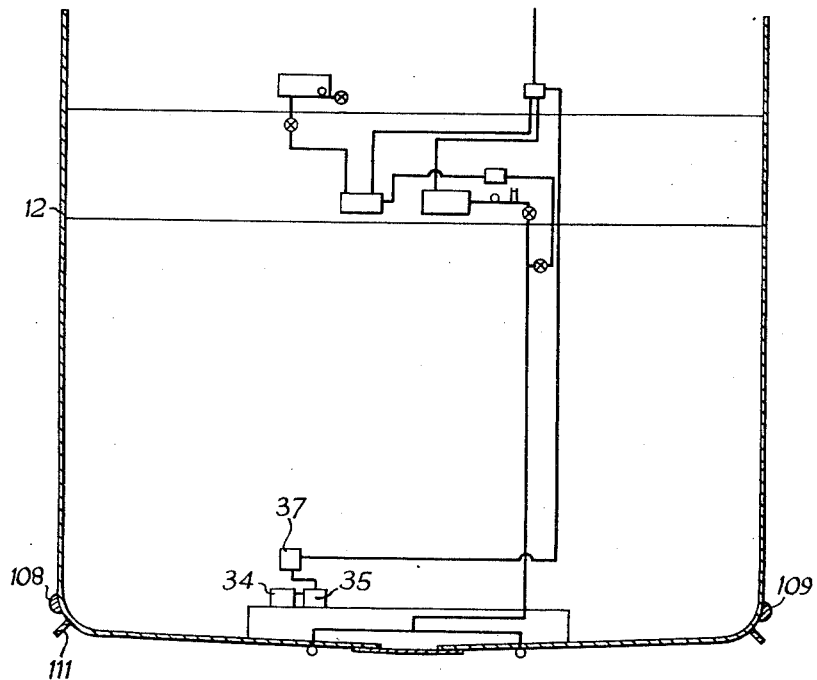

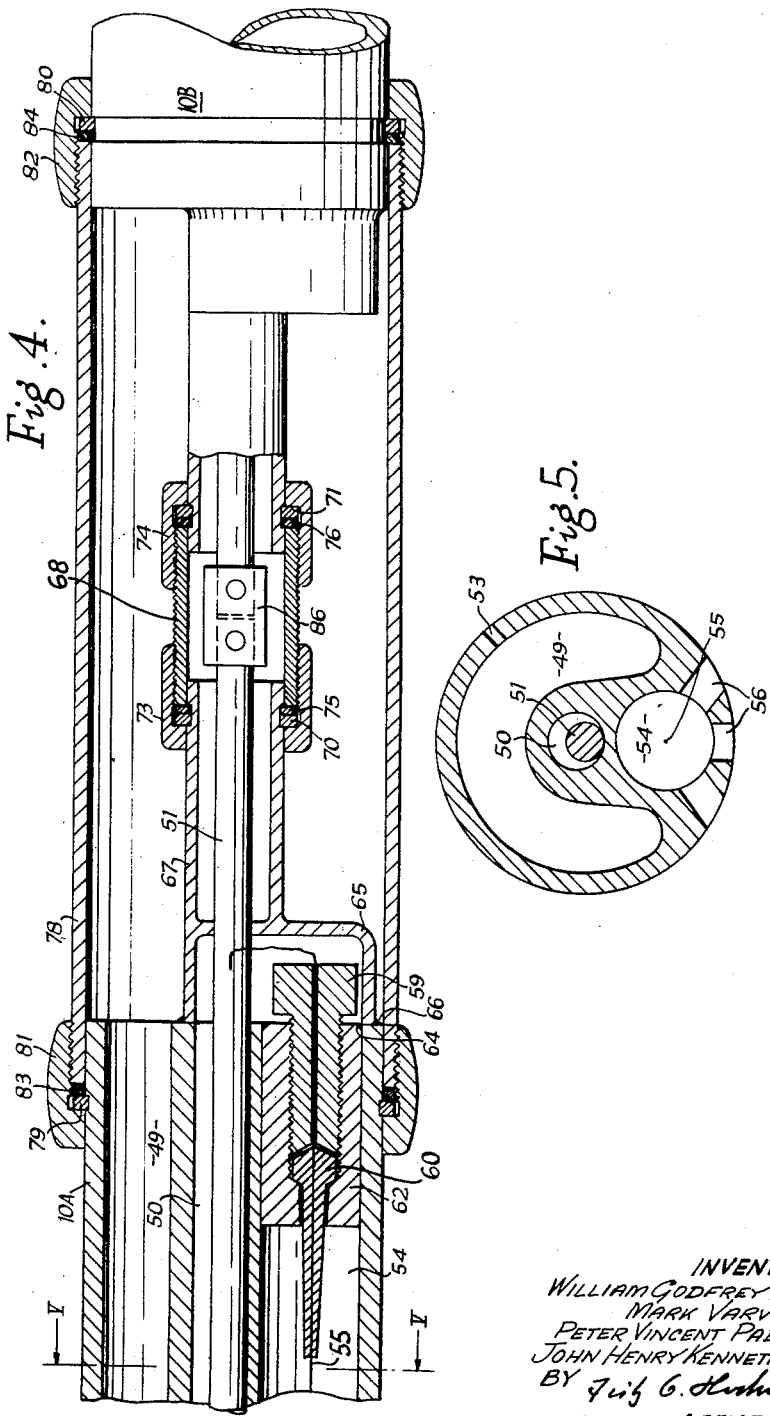

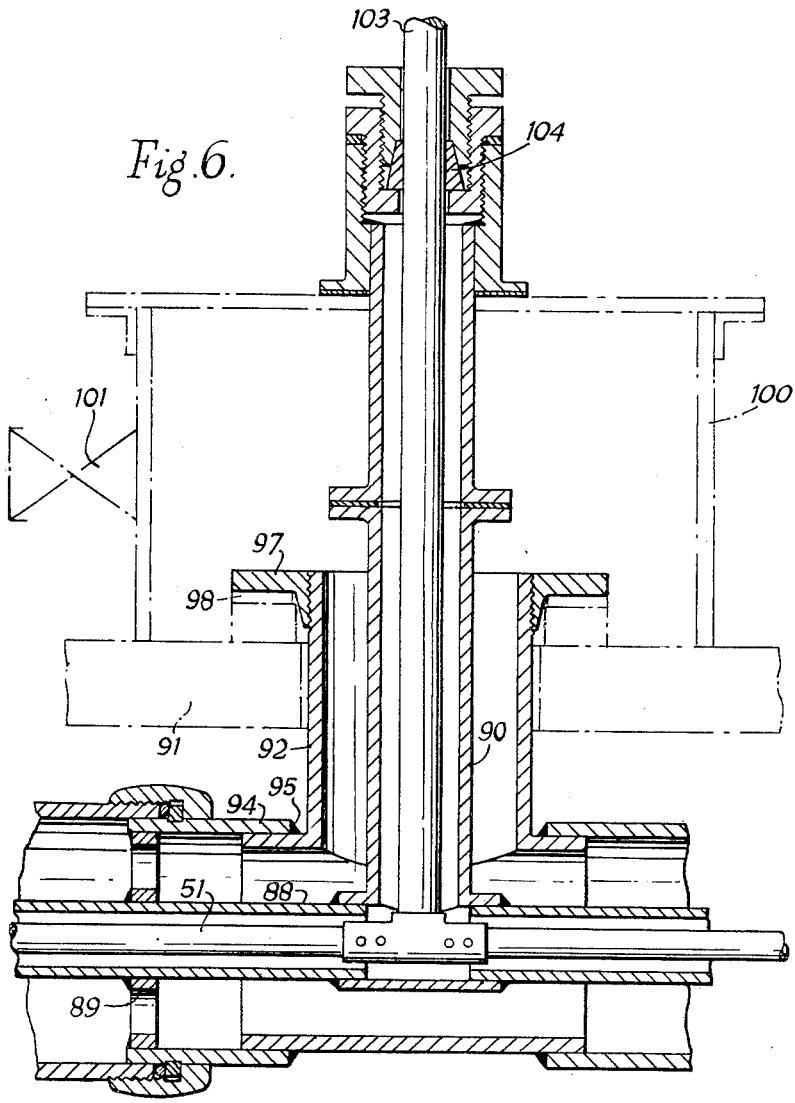

United States Patent Office

3,069,336
Patented Dec. 18, 1962

3,069,336
PROTECTION OF SHIPS' HULLS
William G. Waite, Mark Varvill, Peter Vincent Palmer, and John Henry Kenneth Tait, all of London, England, assignors to F. A. Hughes & Co. Limited, London, England, a company of Great Britain
Filed May 22, 1958, Ser. No. 737,127
Claims priority, application Great Britain May 22, 1957
14 Claims. (Cl. 204—148)

The present invention relates to ships and in particular to the protection of metal hulls against corrosion. It further relates to the protection of ships' hulls against fouling with barnacles, other similar marine growth and marine vegetation.

It has been known to attach sacrificial anodes of magnesium, zinc or other suitable metals to the hull of a ship whereby an electric current is developed electrolytically so as to provide a method of cathodic protection against corrosion of the hull or to achieve the same effect by providing non-sacrificial anodes supplied with electric current, this latter method being known as "impressed current method."

We have now found that it is possible to reduce the electric current required for the protection of the hull whereby the size and/or number of sacrificial anodes, or the size of the impressed current equipment, can be reduced by the presence of a liquid growth deterrent on the outer surface of the hull.

According to the present invention therefore the process for the protection of the metal hull of a ship when in contact with water comprises distributing a substantially water-insoluble liquid marine growth deterrent of greater electrical resistivity than the water surrounding the hull over the underwater surface of the hull, and whilst said deterrent is in contact with the hull making the hull cathodic in relation to an anode or anodes positioned in the water which surrounds the hull. The invention further comprises the combination of means for the distribution of a substantially water-insoluble liquid marine growth deterrent over the underwater surface of the hull of a ship and of means for the application of cathodic protection to said hull.

The distribution of the liquid marine growth deterrent over the underwater surface of a floating ship can be carried out by any suitable means. In order to distribute a thin film of the liquid growth deterrent evenly over the hull it is convenient to disperse the deterrent in a stream of gas, for instance air or the exhaust fumes of an internal combustion engine, and discharge the dispersion adjacent the underwater surface of the hull at suitable points. In rising to the surface of the sea the gas carries the dispersed liquid growth deterrent to the underwater surface of the hull and aids its distribution thereon. Most suitably the liquid growth deterrent, with or without a carrier gas, is distributed beneath the hull of a ship through perforated pipes attached thereto and preferably running lengthways of the ship. A suitable system of perforated pipes is described in the specification of co-pending British patent application No. 8,058/58. Alternatively, individual outlets suitably positioned in the underwater surface of the hull can be employed.

Any substantially water-insoluble liquid of greater electrical resistivity than the water in which the hull is floating can be used in the process of the present invention provided that it has growth deterrent properties. By growth deterrent properties is meant throughout this specification the ability either to prevent the formation of marine growth on a ship's hull or to reduce the rate of growth of, or preferably kill, any organisms or vegetation already attached to the hull of a ship.

The marine growth deterrent must be liquid at the temperature of the sea surrounding the structure and must be sufficiently water-insoluble to allow it to be distributed over the underwater surface of the structure before complete solution occurs. It must further have a greater electrical resistivity than the water surrounding the ship.

The marine growth deterrent can be a liquid which itself prevents or hinders marine growth or it can be a solution or dispersion of a compound, having the desired growth deterrent properties, in a liquid vehicle. This vehicle need not have growth deterrent properties.

Where the marine growth deterrent consists of a solution or dispersion of a toxic compound in a suitable liquid vehicle, the liquid vehicle must be sufficiently water-insoluble to enable the marine growth deterrent to wet the surface of the hull and the compound must also be sufficiently water-insoluble to remain effective. Slow solution of the deterrent or any of its components in sea water can be tolerated.

Liquids particularly suitable as a growth deterrent are liquid hydrocarbons, e.g. the various petroleum fractions. Preferred liquids are kerosene and light diesel oils which are readily available and have a deterrent effect on the growth of marine fouling. If desired they can also be used as liquid vehicles for the solution or dispersion of compounds which are toxic to marine growth.

Compounds which can be dissolved or dispersed in suitable liquid carriers to provide marine growth deterrents for use in the process of the present invention are solid metals or metal compounds as described in the specification of British application No. 33,377/57, for example the oxides of copper, arsenic or mercury; and organic compounds such as 2:4-di-isobutyl phenol, phenyl mercury nitrate and acetate, pyrethrum, pentachlorophenol, derris extract, ethyl bromoacetate, zinc phenyl dithiocarbamate, diphenyl arsenious acid, dichlorodiphenyl-trichloroethane, and p-dichlorobenzene.

In the operation of the process of the present invention it is found that the presence of the liquid growth deterrent on the outer surface of the hull of a ship not only prevents the accumulation of marine growth on the hull but also reduces the current required between the anodes and the cathodic hull for the effective corrosion protection of the hull. Most suitably the liquid growth deterrent should be capable of forming a thin film over the underwater surface of the hull because in this way a maximum reduction of marine fouling and a maximum reduction in cathodic current is obtained for a minimum quantity of marine growth deterrent. The distribution of the water-insoluble liquid marine growth deterrent over the underwater surface of the hull can be aided by the presence in the liquid of a wetting agent which improves the ability of the liquid growth deterrent to wet the underwater surface of the hull. Suitable marine growth deterrents of this nature are described in the specification of co-pending British application No. 265/58.

Other marine growth deterrents which can be employed in the process of the present invention are described in co-pending British patent applications Nos. 266/58, 267/58 and 6,898/58. Application No. 266/58 concerns a liquid marine growth deterrent comprising a substantially water-insoluble liquid containing a toxic wetting agent. Application No. 267/58 concerns the use of a liquid marine growth deterrent containing a cationic wetting agent and application No. 6,898/58 concerns the use of liquid marine growth deterrents containing trialkyl or triaryl tin compounds having the formula $R_3SnX$ in which the R radicals represent lower alkyl groups (not more than 6 carbon atoms), aryl groups and aralkyl groups. The aromatic nuclei in the aryl or aralkyl groups can contain various nuclear substituents such as halide groups, nitro groups, alkyl groups and the like. The individual R radicals can be the same or different. X represents inorganic or organic acid residues, a hydroxide group or a group having the formula OY which is connected to the tin atom through the oxygen atom and in which Y is an R radical as defined above or the group —SnR$_3$.

The hull of the ship may be made cathodic in relation to the anode or anodes by any of the known techniques of cathodic protection as applied to ships.

In one form of protection the potential difference between the hull of the ship and the anode or anodes is maintained by galvanic action. This is achieved by making the anodes of a metal which is sufficiently anodic with respect to the hull that a galvanic electrical circuit is set up and there is an adequate voltage differential between the hull and the anodes. With this type of cathodic protection as applied to ferrous hulls the anodes are preferably made of magnesium, zinc, aluminium, or alloys of these metals.

An alternative form of cathodic protection known as impressed current cathodic protection comprises a separate source of electric power which is joined electrically to the hull of the ship and an anode or anodes in the water surrounding the ship. The source of electric power is so arranged that it maintains the hull cathodic with respect to the anodes. Platinum is a particularly useful metal for the manufacture of substantially inert anodes which may be made by coating a more readily available metal with platinum. The use of anodes consisting of titanium coated with platinum are also envisaged.

As is well known in the cathodic protection of ships' hulls the shape and positioning of the anodes in relation to the hull of the ship is important and varies with the degree of protection to be given. The same considerations govern the design of anodes for use in the process of the present invention. Most suitably the anode or anodes are positioned and shaped so as to give a substantially uniform current density over the hull to be protected.

In all types of cathodic protection it is formed that the best protection of the metal hulls is obtained if there is a considerable voltage differential between the hull of the ship and the anode or anodes. This means that in practice a considerable current flows between the anodes and the hull with the result that there is a high consumption of anode metal in the galvanic type of cathodic protection and considerable electric power is consumed in the impressed current type of cathodic protection. The process of the present invention gives any required degree of cathodic protection with considerable economies as compared with prior art techniques. These economies take the form of considerable saving of anode metal in galvanic protection and considerably reduced power consumption in impressed current cathodic protection.

It is found that the settlement of marine fouling on a ship's hull takes place primarily when the ship is stationary or near-stationary, as for instance when it is in harbour. Accordingly, the process of the present invention is particularly applied to a ship in harbour by applying cathodic protection in the presence of the deterrent. It is found that when a growth deterrent such as kerosene has been discharged beneath the hull of a ship a film of deterrent remains on the underwater surface of the hull and serves to reduce the electrical current required for the cathodic protection of the ship for a considerable period after the discharge of fresh deterrent has ceased.

The invention is illustrated by way of example in the accompanying diagrammatic drawings, wherein:

FIGURE 3 is also a cross-sectional view thereof but showing sacrificial anodes;

FIGURE 4 is a sectional view of the junction of two tubular housing sections;

FIGURE 5 is an end view of a tubular housing section; and

FIGURE 6 shows a section at the end of the tubular housing where the conductor enters through the hull.

Figure 1:
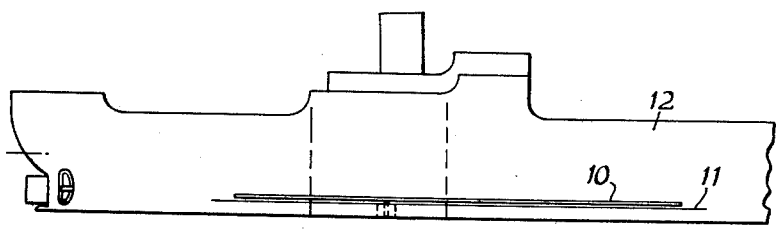
FIGURE 1 is a side elevation of a ship fitted with apparatus made in accordance with the invention.

A pipe-like or tubular housing 10 is located just above the bilge keel 11 of the ship 12. In the construction according to FIGURES 2 and 4 to 6 this housing is connected through the hull to pipes 13 which are supplied with exhaust gases and poison. The pipes 13 are fed from a pipe 20 and compressor 21. The compressor is driven by an electric motor 22 connected by lead 23 to a junction box 24 that is connected by lead 25 to the electrical current supply of the ship. The junction box is connected by lead 26 to an injector pump 27 which draws liquid marine deterrent by pipe 28 from a tank 29 and supplies the deterrent by pipe 30 through a delivery indicator 31 to a pipe 32 which introduces the deterrent into the compressed air pipe 20. Electric current is supplied by a motor 34, driving a generator 35 which supplies current by lead 36 via a control panel 37 and lead 38 to the junction box 24.

The housing 10 is made up from a number of sections as shown at 10A, 10B in FIGURE 4, that have their adjacent ends spaced apart. The section has a first channel 49 therethrough for the exhaust gases and poison, a second channel 54 containing a platinum wire electrode 55, and a third channel 50 which contains an electric conductor rod or bus-bar 51. The channel 49 is U-shaped around the central channel 50. The opening 49 has outlets 53 along the sections through which the gases escape and flow up over the surface of the hull and destroy the marine growths thereon. The channel 54 has slots 56 which serve as openings to the seawater. Each end of the anode 55 passes through a plug 59 and gland packers 60 which seat in the end of a threaded hole in a sleeve 62. The sleeve 62 is heat or solvent welded at 64 in the end of the opening. A cap 65 is welded at 66 to the section and covers the plug 59 and anode 55 and surrounds the rod 51. The cap has a tubular extension 67 around the rod 51. The extension 67 is connected to the corresponding adjacent extension by sleeve 68 located by split spring rings 70, 71 located by the sleeve and rings 73, 74 screwed on to the sleeve to compress packing rings 75, 76. The adjacent ends of the sections are connected similarly by sleeve 78 surrounding the caps 65, spring rings 79, 80, screwed rings 81, 82 and packing rings 83, 84. The rod 51 is also in sections connected at 86.

Thus a series of electrodes is connected at intervals along a common bus-bar, the latter being isolated from the sea at each section.

Entry through the hull is effected by replacing an extension 67 by a pipe 88 steadied by bush 89 and connected to a T-pipe 90 that passes through a T-sleeve 92 which passes through a hole in the hull 91. The T-sleeve is connected to a pipe extension 94 of the section 10 by welding at 95. The hole in the hull is sealed by a ring 97 and packing 98 and by a box 100 having an inlet valve 101 which box surrounds the ring 97 and pipe 90. The conductor or bus-bar 51 has an extension 103 that leads through the pipe 90 and gland 104 to a source of electrical energy. The conductor 23 is connected to the control panel 37.

If desired the platinum wires may be replaced by rods, e.g. rods of titanium coated with platinum.

If desired the impressed current electrodes may be mounted separately from the housing 10.

Figure 2:
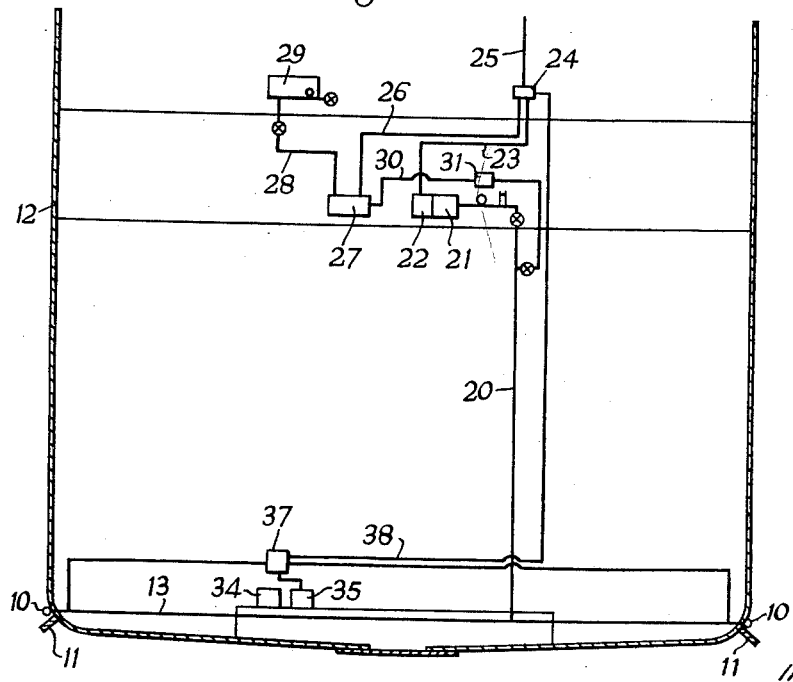
FIGURE 2 is a cross-sectional view of the ship showing impressed current means.

As shown in FIGURE 2 anodes 108, 109 of magnesium, zinc, or other suitable sacrificial material may be attached to the hull in place of using impressed current electrodes 51.

FIGURE 2 also shows a modified arrangement for the housings 10 in which the latter are disposed at the underneath part of the ship between the bilge keels 11.

We claim:

1. The combination of means installed in a ship for the distribution of a substantially water-insoluble gas over the underwater surface of the hull of a floating ship, means for supplying a substantially water insoluble liquid marine growth deterrent into the gas whereby the gas distributes the insoluble liquid deterrent over said surface, and cathodic protection means adjacent to said distribution means for the application of cathodic protection to said ship simultaneously with the distribution of the said gas and liquid deterrent whereby the latter promotes economy in the operation of said cathodic protection means.

2. The combination claimed in claim 1 comprising a tubular housing of electrically insulating material mounted on the outside of the hull and containing a bus-bar therein to which a series of electrodes are connected at intervals along the ship, the bus-bar being connected near at least one end of the ship to electricity supply means within the ship.

3. The combination claimed in claim 1 comprising a tubular housing of electrically insulating material having a first channel therein for the supply of the marine growth deterrent, said channel being connected to the interior of the ship and having outlets to the sea, said housing having a second channel containing at least one electrode connected to electricity supply means within the ship.

4. The combination claimed in claim 3 having a third channel containing a bus-bar to which said electrodes are connected, said housing having means for isolating the third channel from the sea.

5. The combination claimed in claim 4 wherein said means divides the housing into sections each of which contains an electrode.

6. The combination claimed in claim 4 wherein the housing comprises sections having said channels, ends of adjacent sections being coupled together by caps over the second and third channels, said caps having tubular parts connected together and forming a continuation of the third channel, and a sleeve surrounding the caps, said sleeves being connected to said sections.

7. The combination claimed in claim 2 wherein the housing has a transverse extension passing through a hole in the hull, which hole is sealed by a box on the inside of the hull, and a tubular member passing through said box contains an electric conductor connected to the bus-bar.

8. A process for the protection of the metal hull of a ship when in contact with water which comprises a substantially water-insoluble liquid marine growth deterrent of greater electrical resistivity than the water surrounding the hull as a thin film over the underwater surface of the hull, and whilst said deterrent is in contact with the hull making the portion of the hull covered with said film cathodic in relation to an anode or anodes positioned in the water which surrounds the hull.

9. A process as claimed in claim 8 wherein the liquid marine growth deterrent consists essentially of a liquid paraffin hydrocarbon.

10. A process as claimed in claim 8 wherein the hull forms the cathode in a galvanic electrical circuit in which the electrolyte is the water surrounding the ship and the anodes are formed from a member of the group consisting of magnesium, zinc, aluminum and alloys of said metals.

11. A process as claimed in claim 8 wherein the hull forms the cathode of an electric circuit through the anodes in which the electro-motive force is supplied from a separate source of electrical power.

12. Means installed in a ship for the prevention of corrosion and marine life deposits on the surface of the hull comprising cathodic protection means including anodes fixed to the ship and disposed at intervals along the outside underwater surface of the hull, perforated pipes fitted to the ship at least one on each side of the ship and extending along a considerable part of the length of the ship and over a portion of the hull carrying said anodes, means for supplying compressed gas to said pipes and means for supplying a water insoluble liquid marine growth deterrent to said pipes.

13. A process for the protection of the metal hull of a ship when in contact with water, for deterring corrosion and marine life deposits, which comprises feeding a substantially water insoluble gas to a number of positions adjacent the hull surface along a considerable part of the length of the hull feeding a water insoluble liquid into said gas, said liquid having dissolved therein a substance which is poisonous to marine lift, and simultaneously making said considerable part of the length of the hull cathodic in relation to a plurality of anodes carried by the hull and positioned in the water, whereby bubbles of said gas and water-insoluble liquid flow up the surface of the hull while nascent hydrogen forms at said surface 14. A process for the protection of the metal hull of a ship when in contact with water which comprises distributing a substantially water-insoluble liquid marine growth deterrent suspended in a gas selected from the group comprising air and the exhaust fumes from an internal combustion engine, said growth deterrent having greater electrical resistivity than the water surrounding the hull and while said deterrent is in contact with the hull making the hull in the area of said contact cathodic in relation to at least one anode positioned in the water which surrounds the hull.

References Cited in the file of this patent

UNITED STATES PATENTS

| | | |
|---|---|---|
| 1,430,773 | Van Meter | Oct. 3, 1922 |
| 1,673,539 | Warff | June 12, 1928 |
| 2,138,831 | Brammer | Dec. 6, 1938 |
| 2,435,986 | Taylor | Feb. 17, 1948 |
| 2,776,940 | Oliver | Jan. 8, 1957 |